Jan. 24, 1950  D. C. GIRARD  2,495,655
ALTERNATING CURRENT CIRCUIT INVOLVING RECTIFICATION
Filed June 12, 1948
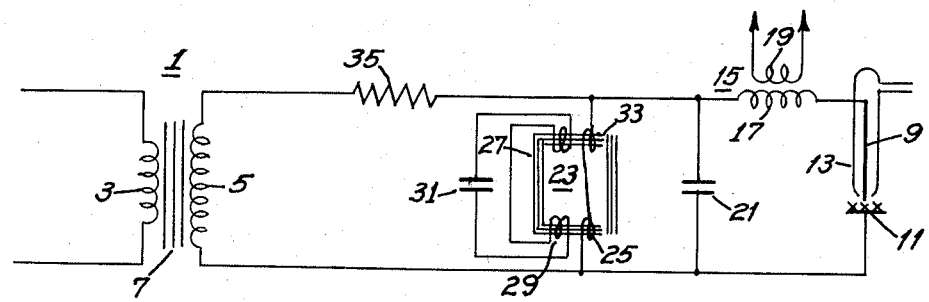
INVENTOR.
DEAN C. GIRARD
BY
Bruce & Brosler
HIS ATTORNEYS Patented Jan. 24, 1950

2,495,655

UNITED STATES PATENT OFFICE 2,495,655

ALTERNATING CURRENT CIRCUIT INVOLVING RECTIFICATION

Dean C. Girard, San Leandro, Calif., assignor, by mesne assignments, to National Cylinder Gas Company, a corporation of Delaware Application June 12, 1948, Serial No. 32,658

10 Claims. (Cl. 315—276)

My invention relates to alternating current circuits, and more particularly to alternating current circuits in which rectification takes place such as in circuits utilizing an electric arc or other gaseous discharge device. While the invention is of general utility in such circuits, it is of particular importance in connection with alternating current arc welding, and for purposes of illustration, will be described in its application to an arc welding circuit commonly employed in the welding of aluminum, magnesium and other such metals or alloys thereof.

In a conventional circuit for the arc welding of such materials, a certain amount of rectification occurs between the work and the electrode. The resulting direct current component flowing through the circuit including the secondary winding of the input or supply transformer, not only causes undue heating, but tends to saturate the transformer core with direct current flux which results in increased primary current and additional heating due to resulting extremely low power factor.

To realize a given output at normal operating conditions, therefore, a much larger transformer must be employed than normally would be employed were it not for the presence of the direct current component flowing through the transformer secondary winding.

Among the objects of my invention are:

(1) To provide a novel and improved alternating current circuit;

(2) To provide a novel and improved alternating current circuit wherein rectification is an inherent characteristic;

(3) To provide a novel and improved arc welding circuit;

(4) To provide a novel and improved alternating current arc welding circuit for the welding of aluminum, magnesium and the like;

(5) To provide a novel and improved alternating current arc welding circuit utilizing an inert gas torch;

(6) To provide a novel and improved alternating current arc welding circuit of increased operation efficiency;

(7) To provide a novel and improved alternating current arc welding circuit wherein inherent rectification is caused to improve the efficiency of the circuit.

Additional objects of my invention will be brought out in the following description of the same, taken in conjunction with the accompanying drawing wherein the figure is a circuit diagram of an alternating current arc welding circuit embodying the features of the present invention.

This circuit, with reference to the drawing, involves a transformer 1 having a primary winding 3 and a secondary winding 5 mounted on a core 7. The secondary winding has one end thereof connected to a welding electrode 9 normally of tungsten, while the other end of the secondary winding is connected to the work 11 which functions as a second electrode. Such electrodes constitute in effect, a device having inherent rectifying action.

In the welding of such metals as aluminum, magnesium and the like, the tungsten electrode is supported in a casing 13 having connection to a source of inert gas such as helium, argon, crypton and the like, which is releasable about the electrode during welding to exclude any oxidizing atmosphere from the region of the arc.

To stimulate a maintenance of an arc during cycle reversals of the alternating current, it is conventional to employ a high frequency potential which is introduced into the circuit through a high frequency transformer 15 whose secondary 17 is in one of the connections from the input transformer 1 while the primary 19 of the high frequency transformer is connected to some high frequency oscillator (not illustrated). In this connection, a condenser 21 across the input transformer circuit is employed to by-pass around the secondary winding of the input transformer, such high frequency current as may be introduced into the circuit from the high frequency oscillator.

As thus far described, the circuit is conventional, and from the very nature of such circuit, it is noted that any rectification occurring at the arc, will of necessity have to flow through the secondary winding of the input transformer, with the results previously indicated.

Toward fulfillment of the objects of the present invention as previously set forth, I introduce into the circuit across the arc, a choke 23 of high impedance at the frequencies of the alternating current flowing in the circuit, but offering low resistance to the flow of any direct current component resulting from such rectification as takes place at the arc.

While such choke might take the form of a single winding, a more compact choke may be realized by mounting a primary winding 25 of few turns and low direct current resistance, on a core 27, and coupling thereto on the same core, a secondary winding 29 of high impedance to the alternating currents in the circuit, the impedance so offered being made maximum by tuning the secondary winding with a condenser 31 to the frequency of the current from the input transformer.

The core of the choke is preferably provided with an air gap 33 to avoid probable saturation of the core by the direct current flowing through the primary winding of the choke.

In conjunction with the aforementioned choke, a resistance 35 in one of the leads between the choke and the input transformer will serve to encourage the flow of any direct current through the choke in preference to the secondary winding of the input transformer and enhance the effectiveness of the circuit toward accomplishing the desired results.

The introduction in the circuit of the resistance-choke arrangement described, not only permits of the use of a supply transformer designed to smaller dimensions both as to core and wire size, but the magnitude of the direct current component becomes somewhat larger by reason of the low resistance path provided for it. This increased direct current component has been found to greatly enhance the welding results. It is believed that this may be attributable to the fact that this component is in the proper direction to clean oxide from the work surface, and by permitting a larger direct current component to flow, the period of such cleaning, per cycle of alternating current, becomes greater, thus producing better welds and with increased penetration.

Accordingly, as an invention of general application to alternating current circuits in which rectification takes place, the invention will materially cut down heating losses, at the same time permitting of the use of smaller and lighter weight equipment. In an alternating current arc welding circuit, the invention provides the added advantage of improved welding result.

From the above description of one form of my invention, it will be apparent that the same fulfills all the objects of the invention as previously recited, and while I have discussed this particular form of my invention in considerable detail, the same is subject to alteration and modification without departing from the underlying principles involved, and I accordingly do not desire to be limited in my protection to such details, except as may be necessitated by the appended claims.

I claim:

1. An alternating current circuit comprising a source of alternating current, means connected to said source, said means including a device having inherent rectifying action, and choke-resistor network means for substantially excluding rectified current from said source of alternating current.

2. An alternating current circuit comprising a source of alternating current, a load connected to said source, said load including a device having inherent rectifying action, and low direct current resistance choke means across said device for substantially excluding rectified current from said source of alternating current.

3. An alternating current circuit comprising a source of alternating current, a load connected to said source, said load including a device having inherent rectifying action, and choke-resistor network means in said circuit for substantially excluding rectified current from said source of alternating current.

4. An alternating current circuit comprising a source of alternating current including a transformer having a core and a primary winding and secondary winding on said core, means connected to said secondary winding, said means including a device having inherent rectifying action, and a choke-resistor network including a high impedance-low direct current resistance choke connected across said load to substantially preclude flow of direct current through said secondary winding and enhance the magnitude of direct current through said load.

5. An alternating current circuit comprising a source of alternating current including a transformer having a core and a primary winding and secondary winding on said core, a load connected to said secondary winding, said load including a device having inherent rectifying action, and choke means including a high impedance-low direct current resistance choke connected across said load to substantially preclude flow of direct current through said secondary winding and enhance the magnitude of direct current through said load.

6. An alternating current circuit comprising a source of alternating current including a transformer having a core and a primary winding and secondary winding on said core, a load connected to said secondary winding, said load including a device having inherent rectifying action, and a choke-resistor network including a high impedance-low direct current resistance choke connected across said load and a relatively high resistance in the connection from said transformer secondary winding, to substantially preclude flow of direct current through said secondary winding and enhance the magnitude of direct current through said load.

7. An alternating current arc welding circuit comprising a source of alternating current, a load connected to said source, said load including a pair of electrodes, one of which constitutes a welding electrode, and choke-resistor network means between said source of alternating current and said load.

8. An alternating current arc welding circuit comprising a source of alternating current, a load connected to said source, said load including a pair of electrodes, one of which constitutes a welding electrode and the other the work, and choke means of low direct current resistance connected across the circuit intermediate said source and said pair of electrodes.

9. An alternating current arc welding circuit comprising a source of alternating current including a transformer having a core and a primary winding and secondary winding on said core, a load connected to said secondary winding, said load including a pair of electrodes, one of which constitutes a welding electrode, a high impedance-low direct current resistance choke connected across the circuit intermediate said transformer and said load, said choke including a core, a low resistance primary winding and a secondary winding on said core, and means tuning said secondary winding to substantially the frequency of said source of alternating current.

10. An alternating current arc welding circuit comprising a source of alternating current including a transformer having a core and a primary winding and secondary winding on said core, a load connected to said secondary winding, said load including a pair of electrodes, one of which constitutes a welding electrode and the other the work, and choke-resistor network means including a high impedance-low direct current resistance choke connected across the circuit intermediate said transformer and said pair of electrodes, said choke comprising a core, a low direct current resistance primary winding and a high impedance secondary winding on said core, and a relatively high resistance in the connection from said transformer secondary winding.

DEAN C. GIRARD.

REFERENCES CITED

The following references are of record in the file of this patent:

UNITED STATES PATENTS

| Number | Name | Date |
| --- | --- | --- |
| 2,310,015 | Agnew | Feb. 2, 1943 |
| 2,322,709 | Owen | June 22, 1943 |